United States Patent
Dabin

[11] Patent Number: 5,518,097
[45] Date of Patent: May 21, 1996

[54] CLUTCH TENSION REGULATOR

[76] Inventor: Clayton Dabin, 5539-A Kawaihau Rd., Kapaa, Hi. 96746

[21] Appl. No.: 340,638
[22] Filed: Nov. 16, 1994
[51] Int. Cl.⁶ ..................................... F16C 1/10
[52] U.S. Cl. .............. 192/99 R; 74/500.5; 74/501.6; 74/502.3; 74/511 R
[58] Field of Search .............. 192/99 R; 74/500.5, 74/501.5 R, 501.6, 502.2, 502.3, 504, 510, 511 R

[56] References Cited

U.S. PATENT DOCUMENTS

| 2,129,320 | 9/1938 | Gearns. | |
|---|---|---|---|
| 2,423,483 | 7/1947 | Clark. | |
| 2,773,398 | 12/1956 | Swain. | |
| 2,860,873 | 11/1958 | Miles, Jr.. | |
| 4,624,155 | 11/1986 | Wing. | |
| 4,813,304 | 3/1989 | Kobayashi | 74/501.5 R |
| 5,044,222 | 9/1991 | Tanaka et al. | 74/500.5 |

Primary Examiner—Andrea L. Pitts
Attorney, Agent, or Firm—Michael I. Kroll

[57] ABSTRACT

A clutch tension regulator between a distal end of a clutch cable from a clutch pedal in a motor vehicle and a clutch lever having an aperture which operates a clutch mechanism within a transmission housing. The clutch tension regulator comprises a tautness member connected in an adjustable manner into the aperture of the clutch lever. A flexible member passes over the tautness member. A unit is provided for securing a first end of the flexible member in a stationary manner onto the transmission housing. An assembly is provided for coupling a second end of the flexible member to the distal end of the clutch cable. The tautness member can be manually adjusted to increase and decrease tension on the clutch cable, to make the clutch mechanism easier to operate.

12 Claims, 2 Drawing Sheets

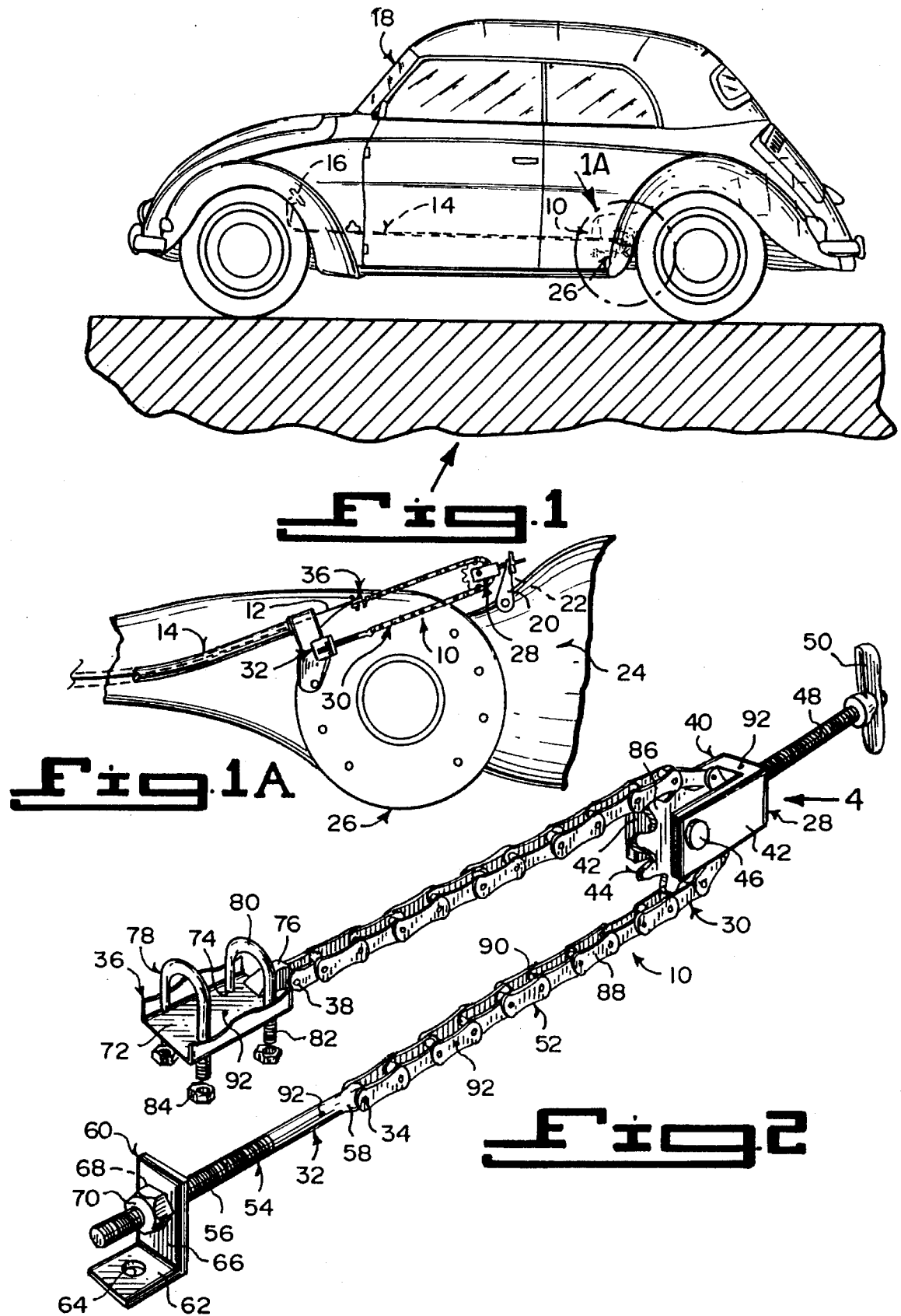

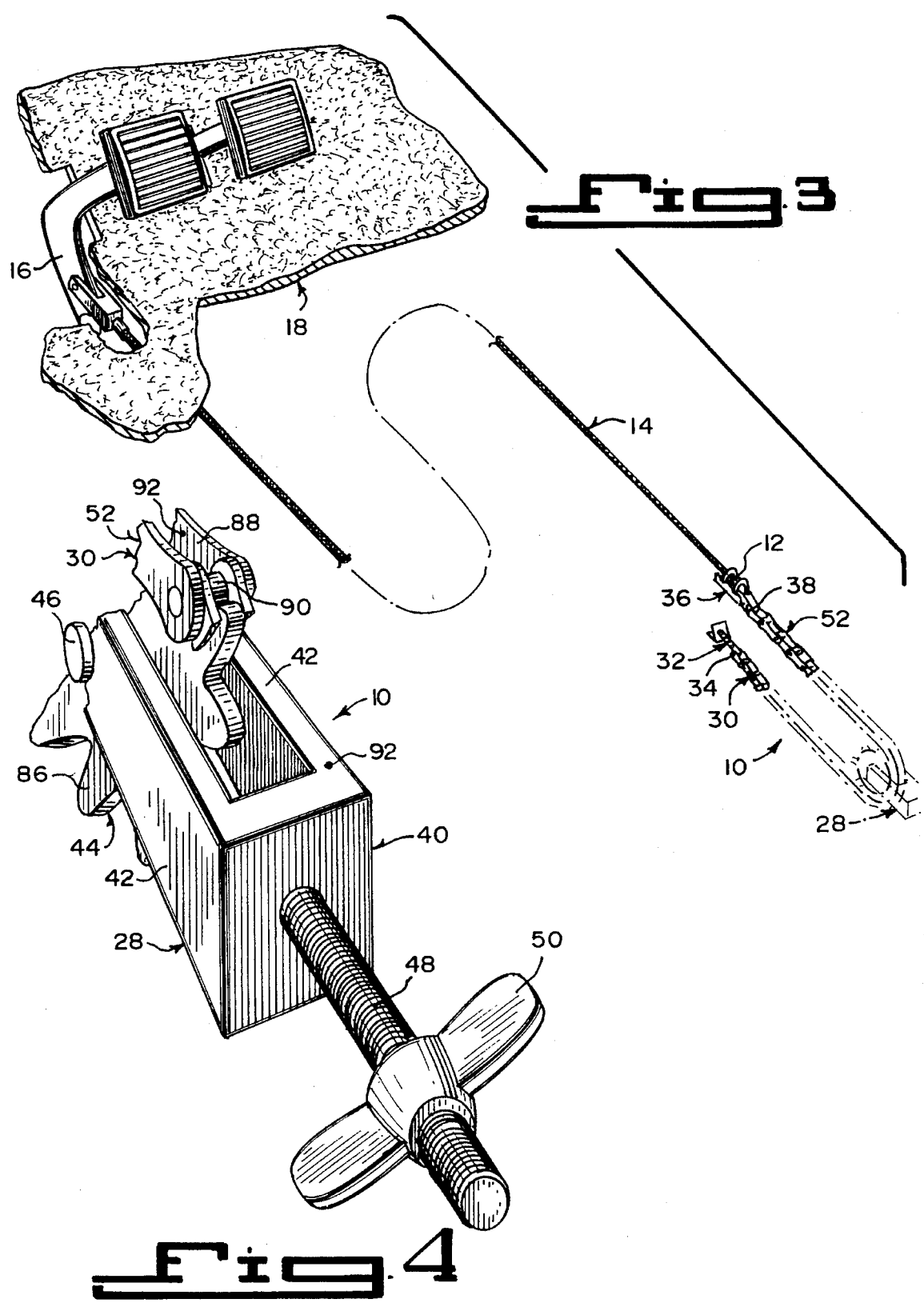

5,518,097

CLUTCH TENSION REGULATOR

BACKGROUND OF THE INVENTION

1. Field of the Invention

The instant invention relates generally to support linkages and more specifically it relates to a clutch tension regulator.

2. Description of the Prior Art

Numerous support linkages have been provided in prior art. For example, U.S. Pat. Nos. 2,129,320 to Geairns; 2,423,483 to Clark; 2,773,398 to Swain; 2,860,873 to Miles, Jr. and 4,624,155 to Wing all are illustrative of such prior art. While these units may be suitable for the particular purpose to which they address, they would not be as suitable for the purposes of the present invention as heretofore described.

SUMMARY OF THE INVENTION

A primary object of the present invention is to provide a clutch tension regulator that will overcome the shortcomings of the prior art devices.

Another object is to provide a clutch tension regulator that will compensate in an adjustable manner for the variation in the effective length of a clutch cable upon actuation of the supporting linkage between the clutch pedal and the clutch mechanism in a transmission.

An additional object is to provide a clutch tension regulator having a novel way of securing the clutch cable to a clutch rod in such a manner as to take up the slack in the cable, so that when the clutch cable is actuated it will effect pivoting of the clutch rod, which in turn operates the clutch mechanism in the transmission.

A further object is to provide a clutch tension regulator that is simple and easy to use.

A still further object is to provide a clutch tension regulator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a side view of a motor vehicle incorporating the instant invention therein.

FIG. 1A is an enlarged side view of the internal area as indicated by arrow 1A in FIG. 1, showing the hook up of the instant invention.

FIG. 2 is a further enlarged front perspective view of the instant invention per se.

FIG. 3 is a rear perspective view with parts broken away and in phantom, showing the clutch cable linkage between the clutch pedal and the instant invention.

FIG. 4 is a rear perspective view with parts broken away taken in the direction of arrow 4 in FIG. 2, showing the tautness member in greater detail.

Similar reference characters denote corresponding features consistently throughout the attached drawings.

DETAILED DESCRIPTION OF THE PREFERRED EMBODIMENTS

Turning now descriptively to the drawings, FIGS. 1 through 4 illustrate a clutch tension regulator 10 between a distal end 12 of a clutch cable 14 from a clutch pedal 16 in a motor vehicle 18, and a clutch lever 20 having an aperture 22 which operates a clutch mechanism 24 within a transmission housing 26. The clutch tension regulator 10 comprises a tautness member 28 connected in an adjusting manner into the aperture 22 of the clutch lever 20. A flexible member 30 passes over the tautness member 28. A unit 32 is for securing a first end 34 of the flexible member 30 in a stationary manner onto the transmission housing 26. An assembly 36 is for coupling a second end 38 of the flexible member 30 to the distal end 12 of the clutch cable 14. The tautness member 28 can be manually adjusted to increase and decrease tension on the clutch cable 14, to make the clutch mechanism 24 easier to operate.

The tautness member 28 includes a forked bracket 40, having a pair of parallel arms 42. A sprocket wheel 44 fits in between the parallel arms 42 of the forked bracket 40. a spindle 46 is through the parallel arms 42 of the forked bracket 40 and centrally through the sprocket wheel 44. The sprocket wheel 44 can rotate between the parallel arms of the forked bracket 40.

An elongated threaded shank 48 extends rearwardly from the forked bracket 40 and through the aperture 22 of the clutch lever 20. A wing nut 50 is threaded onto a distal end of the elongated threaded shank 48, to bear against the clutch lever 20. The flexible member 30 is a length of bicycle chain 52, which will engage with the sprocket wheel 44.

The securing unit 32 consists of an eye bolt 54 having an elongated threaded shaft 56 and an eye head 58, which is connected to the first end 34 of the bicycle chain 52. An L-shaped bracket 60 has a short arm 62 with a first hole 64 therethrough, and a long arm 66 with a second hole 68 therethrough. The short arm 62 is affixed to the transmission housing 26 by a fastener (not shown) through the first hole 64. The second hole 68 of the long arm 66 receives the elongated threaded shaft 56 of the eye bolt 54 therethrough. A hex nut 70 is threaded onto a distal end of the elongated threaded shaft 56 of the eye bolt 54, to bear against the long arm 66 of the L-shaped bracket 60.

The coupling assembly 36 contains a plate 72 having two pair of spaced apart holes 74 therethrough and a fitting 76 which is connected to the second end 38 of the bicycle chain 52. A pair of U-bolts 78 are provided. Each U-bolt 78 has a round bend 80 with threaded ends 82 to fit into one pair of spaced apart holes 74 in the plate 72. four hex nuts 84 are also provided. Each hex nut 84 is threaded onto one threaded end 82 of one U-bolt 78, to bear against a bottom surface of the plate 72. The U-bolts 78 will grip the distal end 12 of the clutch cable 14 against a top surface of the plate 72.

The sprocket wheel 44 includes a circular periphery with a plurality of teeth 86 formed thereabout. The teeth 86 engage with the bicycle chain 52, to prevent slippage between the sprocket wheel 44 and the bicycle chain 52. The bicycle chain 52 contains a plurality of links 88 interconnected with a plurality of rollers 90. The rollers 90 will engage with the teeth 86 on the sprocket wheel 44.

The forked bracket 40, the sprocket wheel 44, the spindle 46, the elongated threaded shank 48 and the wing nut 50 of the tautness member 28 are all fabricated out of a durable non-corrosive metal material 92. The bicycle chain 52 is also fabricated out of the durable non-corrosive metal material 92. The plate 72, the U-bolts 78 and the hex nuts 84 of the coupling assembly 36 are also fabricated out of the durable non-corrosive metal material 92.

In FIGS. 1 and 1A, a motor vehicle 18 and a transmission housing 26 is illustrated. The clutch tension regulator 10 can be utilized in other types of manual transmissions having a clutch pedal 16, a clutch cable 14 and a clutch lever 20, similar to those shown in the drawings.

The eye bolt 54, the L-shaped bracket 60 and the hex nut 70 of the securing unit 32 are also all fabricated out of the durable non-corrosive metal material 92.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A clutch tension regulator connected between a distal end of a clutch cable extending from a clutch pedal in a motor vehicle and a clutch lever having an aperture which operates a clutch mechanism within a transmission housing, said clutch tension regulator comprising:
    a) a tautness member connected in an adjustable manner into the aperture of the clutch lever;
    b) a flexible member passing over said tautness member;
    c) means for securing a first end of said flexible member in a stationary manner onto the transmission housing; and
    d) means for coupling a second end of said flexible member to the distal end of the clutch cable, so that said tautness member is manually adjusted to increase and decrease tension on the clutch cable to make the clutch mechanism easier to operate.

2. A clutch tension regulator as recited in claim 1, wherein said tautness member includes:
    a) a forked bracket having a pair of parallel arms;
    b) a sprocket wheel to fit inbetween said parallel arms of said forked bracket; and
    c) a spindle connected through said parallel arms of said forked bracket and centrally through said sprocket wheel, so that said sprocket wheel can rotate between said parallel arms of said forked bracket.

3. A clutch tension regulator as recited in claim 2, wherein said tautness member further includes:
    a) an elongated threaded shank extending from said forked bracket and through the aperture of the clutch lever; and
    b) a wing nut threaded onto a distal end of said elongated threaded shank to bear against the clutch lever.

4. A clutch tension regulator as recited in claim 3, wherein said flexible member is a length of bicycle chain, which will engage with said sprocket wheel.

5. A clutch tension regulator as recited in claim 4, wherein said securing means includes:
    a) an eye bolt having an elongated threaded shaft and an eye head which is connected to the first end of said bicycle chain;
    b) an L-shaped bracket having a short arm with a first hole therethrough, and a long arm with a second hole therethrough, whereby said short arm is affixed to the transmission housing by a fastener through said first hole, while said second hole of said long arm receives said elongated threaded shaft of said eye bolt therethrough; and
    c) a hex nut threaded onto a distal end of said elongated threaded shaft of said eye bolt, to bear against said long arm of said L-shaped bracket.

6. A clutch tension regulator as recited in claim 5, wherein said coupling means includes:
    a) a plate having two pair of spaced apart holes therethrough and a fitting which is connected to the second end of said bicycle chain;
    b) a pair of U-bolts, each said U-bolt having a round bend with threaded ends to fit into one pair of spaced apart holes in said plate; and
    c) four hex nuts, with each said hex nut threaded onto one threaded end of one said U-bolt to bear against a bottom surface of said plate, so that said U-bolts will grip the distal end of the clutch cable against a top surface of said plate.

7. A clutch tension regulator as recited in claim 6, wherein said sprocket wheel includes a circular periphery with a plurality of teeth formed thereabout, whereby said teeth engage with said bicycle chain to prevent slippage between said sprocket wheel and said bicycle chain.

8. A clutch tension regulator as recited in claim 7, wherein said bicycle chain includes a plurality of links interconnected with a plurality of rollers, in which said rollers will engage with said teeth on said sprocket wheel.

9. A clutch tension regulator as recited in claim 8, wherein said forked bracket, said sprocket wheel, said spindle, said elongated threaded shank and said wing nut of said tautness member are all fabricated out of a durable non-corrosive metal material.

10. A clutch tension regulator as recited in claim 9, wherein said bicycle chain is fabricated out of a durable non-metal material.

11. A clutch tension regulator as recited in claim 10, wherein said eye bolt, said L-shaped bracket and said hex nut of said securing means are all fabricated out of a durable non-corrosive metal material.

12. A clutch tension regulator as recited in claim 11, wherein said plate, said U-bolts and said hex nuts of said coupling means are all fabricated out of a durable non-corrosive metal material.

* * * * *